US006833753B2

(12) United States Patent
Das

(10) Patent No.: US 6,833,753 B2
(45) Date of Patent: Dec. 21, 2004

(54) METHOD AND SYSTEM FOR SIGNAL DEPENDENT BOOSTING IN SAMPLING CIRCUITS

(75) Inventor: Mrinal Das, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/306,073

(22) Filed: Nov. 27, 2002

(65) Prior Publication Data

US 2004/0100321 A1 May 27, 2004

(51) Int. Cl.[7] ................................................. G05F 3/02
(52) U.S. Cl. ..................................... 327/536; 327/537
(58) Field of Search ................................ 327/534, 536, 327/537; 363/59

(56) References Cited

U.S. PATENT DOCUMENTS

| | | | | |
|---|---|---|---|---|
| 4,106,086 A | * | 8/1978 | Holbrook et al. | 363/60 |
| 4,236,199 A | * | 11/1980 | Stewart | 363/60 |
| 5,489,870 A | * | 2/1996 | Arakawa | 327/536 |
| 5,627,739 A | * | 5/1997 | Yung-Chow et al. | 363/60 |
| 5,828,620 A | * | 10/1998 | Foss et al. | 365/226 |
| 5,852,378 A | * | 12/1998 | Keeth | 327/171 |
| 5,856,918 A | * | 1/1999 | Soneda et al. | 363/60 |
| 6,198,328 B1 | * | 3/2001 | Heyne et al. | 327/295 |
| 6,229,381 B1 | * | 5/2001 | Keeth | 327/536 |
| 6,356,499 B1 | * | 3/2002 | Banba et al. | 365/226 |
| 6,388,505 B1 | * | 5/2002 | Ribellino et al. | 327/536 |

OTHER PUBLICATIONS

Abo, et al. "A 1.5–V, 10–bit, 14.3–MS/s CMOS Pipeline Analog–to–Digital Converter",IEEE Journal of Solid–State Circuits, vol. 34, No. 5, May 1999, pp. 599–606.
Preetam Tadeparthy, Mrinal Das; *Techniques to Improve Linearity of CMOS Sample–and–Hold Circuits for Achieving 100 DB Performance at 80 MSPS*; Texas Instruments (India) Limited, 4 pages.

* cited by examiner

Primary Examiner—Terry D. Cunningham
(74) Attorney, Agent, or Firm—Abdul Zindani; W. James Brady, III; Frederick J. Telecky, Jr.

(57) ABSTRACT

A system for signal boosting includes a capacitance boosting component that contains a first and second transistor and a capacitor, wherein a positive terminal of the capacitor is electrically connected to a drain of the second transistor and a negative terminal of the capacitor is electrically connected to a source of the first transistor. The system also includes a third transistor operable to receive a clock signal. A drain of the third transistor is electrically connected to the positive terminal of the capacitor. A fourth transistor is operable to receive an inverse of the clock signal. A drain of the fourth transistor is electrically connected to the positive terminal of the capacitor. The system further includes a boost component electrically connected to the capacitance boosting component wherein an output of the boost component is within a selected boost voltage range.

18 Claims, 2 Drawing Sheets

METHOD AND SYSTEM FOR SIGNAL DEPENDENT BOOSTING IN SAMPLING CIRCUITS

TECHNICAL FIELD OF THE INVENTION

The present invention relates in general to electrical circuits and more particularly to a system and method for signal boosting.

BACKGROUND OF THE INVENTION

Analog to Digital (A/D) converters are operable to receive an analog input signal and output a corresponding digital signal. It is desirable for the sample and hold circuitry at the front end of the A/D converter to introduce minimal distortion so that a high resolution signal is output from the A/D converter. Accordingly, the input-sampling switch must be highly linear for a large range of input swings. For high frequency sampling of high frequency signals at the input of the A/D converter, signal-dependent parasitic effects can dominate the analog input signal. To output a high resolution digital signal, the A/D converter must minimize these signal-dependent parasitic effects.

Conventional A/D converter designs minimize the signal-dependent parasitic effects using a minimum of two capacitors in a clock multiplier component of the sample and hold circuitry. The sample and hold circuitry may boost the voltage of the analog input signals to minimize the distortion due to signal-dependent parasitic effects. The multiple capacitors occupy a significant amount of circuit surface area. In conventional designs, it is also possible for the voltage output by the sample and hold circuitry to exceed reliability limits, diminishing the performance and digital signal output resolution of the A/D converter.

SUMMARY OF THE INVENTION

From the foregoing, it may be appreciated by those skilled in the art that a need has arisen for a technique to boost input signals for an analog to digital converter. In accordance with the present invention, a system and method for signal boosting are provided that substantially eliminate or greatly reduce disadvantages and problems associated with conventional signal boosting techniques.

According to an embodiment of the present invention, there is provided a system for signal boosting that includes a capacitance boosting component. The capacitance boosting component includes a first transistor operable to receive a supply voltage at a gate and a drain and a second transistor operable to receive a clock signal at a gate. The capacitance boosting component also includes a capacitor, wherein a positive terminal of the capacitor is electrically connected to a drain of the second transistor and a negative terminal of the capacitor is electrically connected to a source of the first transistor. The capacitance boosting component further includes a third transistor operable to receive clock signal at a gate and the supply voltage at a source, wherein a drain of the third transistor is electrically connected to the positive terminal of the capacitor. The capacitance boosting component further includes a fourth transistor operable to receive an inverse of the clock signal at a gate and further operable to receive the supply voltage at a source, wherein a drain of the fourth transistor is electrically connected to the positive terminal of the first capacitor. The system for signal boosting also includes a boost component electrically connected to the capacitance boosting component, wherein an output of the boost component is within a selected boost voltage range.

The present invention provides various technical advantages over conventional signal boosting techniques. For example, one technical advantage is to use one capacitor to perform a voltage boosting function that previously required at least two capacitors. Another technical advantage is to significantly reduce the circuit surface area required to implement the signal boosting system. Other technical advantages may be readily ascertainable by those skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which.

DETAILED DESCRIPTION OF THE INVENTION

Figure 1:
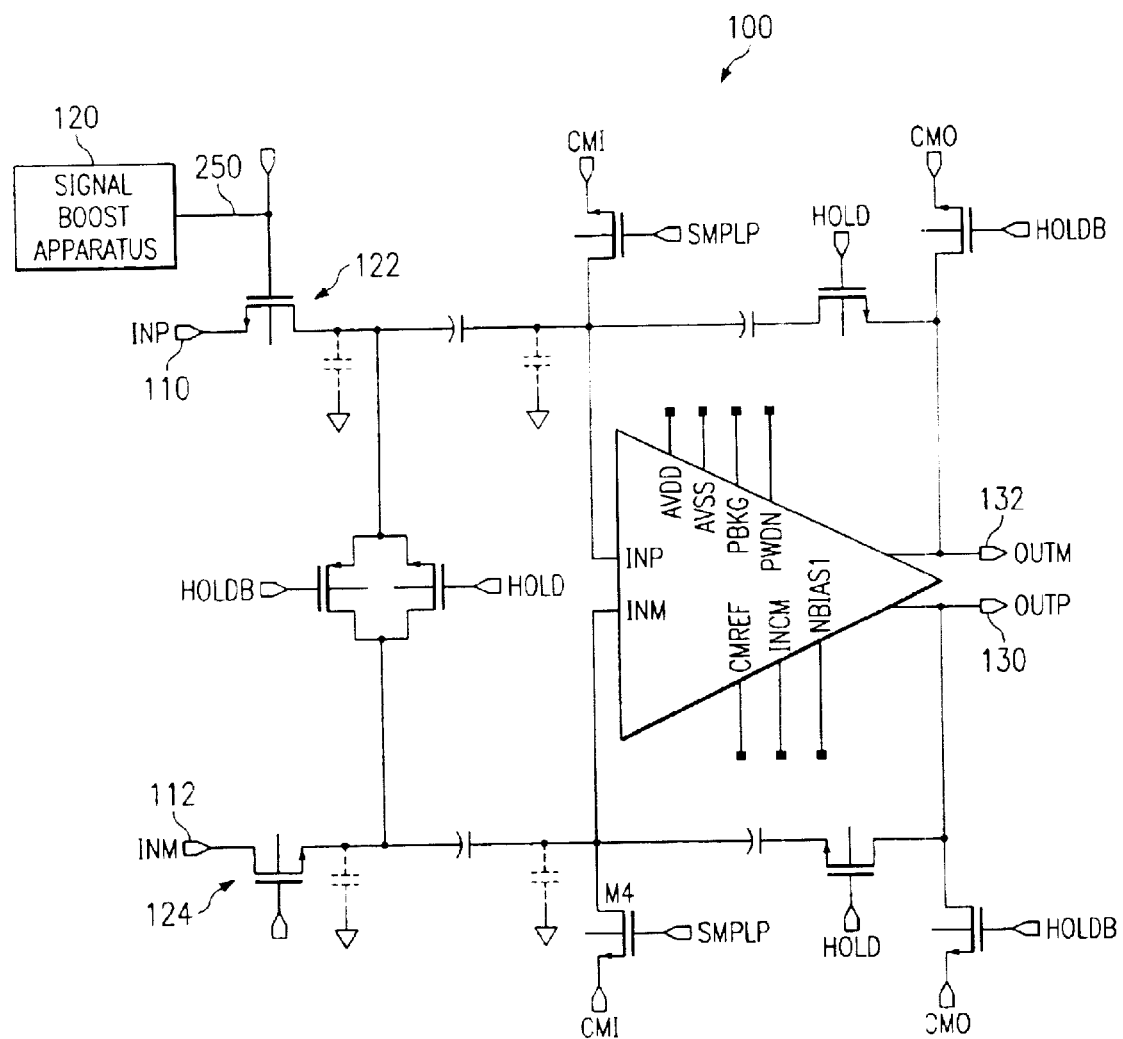
FIG. 1 illustrates an Analog to Digital (A/D) converter circuit schematic including a signal boost apparatus.

FIG. 1 illustrates a circuit schematic of an Analog to Digital (A/D) converter 100. In one embodiment of the present invention, A/I) converter 100 includes analog signal inputs INP 110 and NM 112 and input transistors 122 and 124. In the illustrated embodiment, transistors 122 and 124 are n-channel Metal-Oxide-Semiconductor Field Effect Transistors (MOSFETs) but other types and styles of transistors are envisioned to be within the scope of the present invention. A/D converter 100 also includes a signal boost apparatus 120. A/D converter 100 further includes digital signal outputs OUTP 130 and OUTM 132. Other designs for A/D converter 100 that include signal boost apparatus 120 are envisioned to be within the scope of the present invention.

Figure 2:
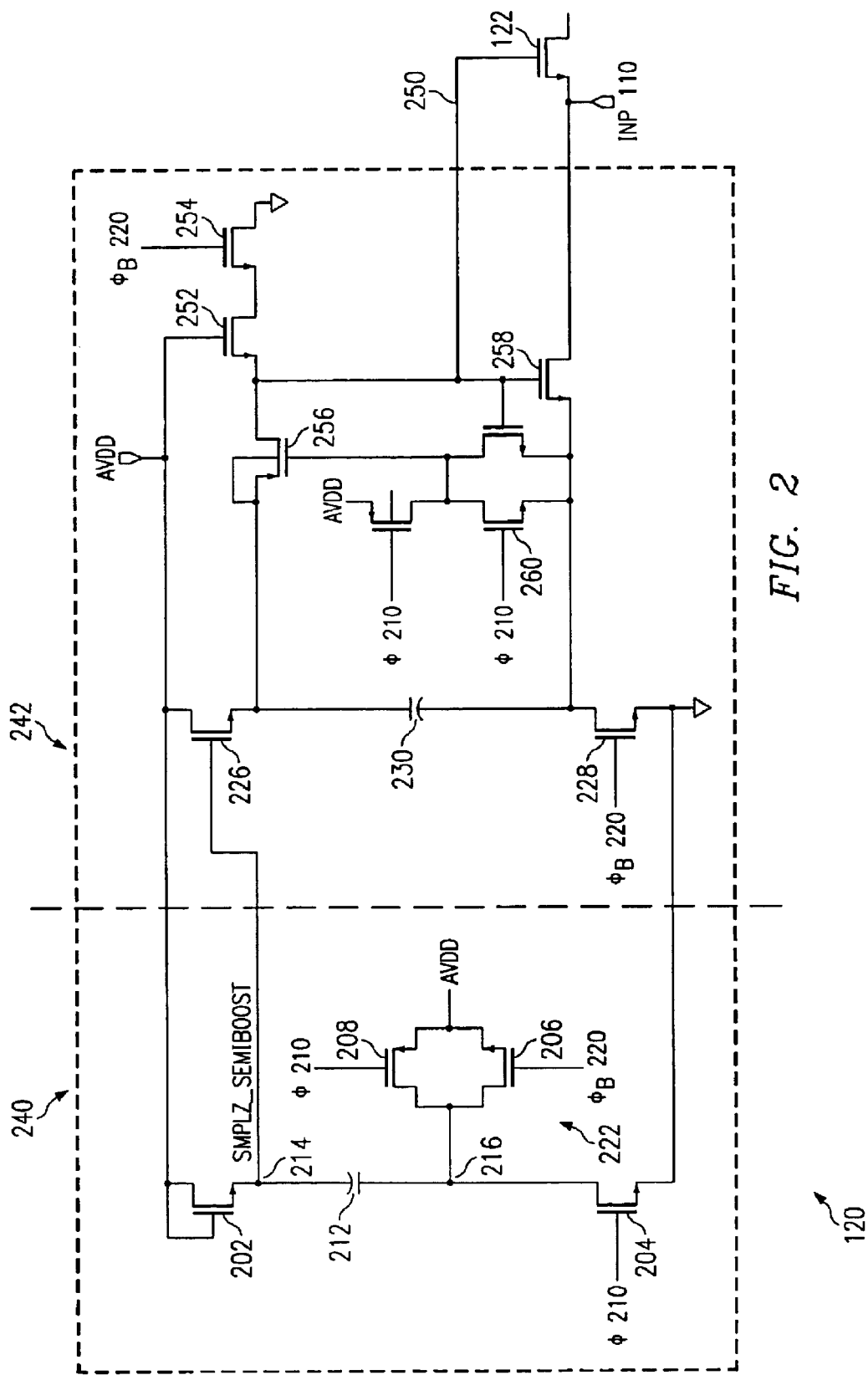
FIG. 2 illustrates a circuit schematic of the signal boost apparatus.

FIG. 2 shows a circuit schematic of one embodiment of signal boost apparatus 120 in greater detail. In the illustrated embodiment, signal boost apparatus 120 includes a capacitance boosting component 240 and a boost component 242. Capacitance boosting component 240 is electrically connected to boost component 242. Signal boost apparatus 120 is illustrated in FIG. 2 as communicating a voltage boosting signal 250 to a gate of transistor 122. The source of transistor 122 is operable to receive analog input signal INP 110. In one embodiment of the present invention, transistor 122 is the input-sampling switch of A/D converter 100.

In one embodiment of the present invention, capacitance boosting component 240 includes transistors 202 and 204 and a capacitor 212. Capacitance boosting component 240 also includes transistors 206 and 208. In one embodiment, transistors 202, 204, 206, and 208 are MOSFETs. Other types and styles of transistors 202, 204, 206, and 208, however, are envisioned to be within the scope of the present invention. In the illustrated embodiment, capacitor 212 is a one pico-Farad (1 pF) capacitor but other sizes of capacitor are within the scope of the present invention.

In one embodiment, transistor 202 receives a supply voltage $AV_{DD}$ at its gate and its drain. In the illustrated embodiment, transistor 202 is a n-channel MOSFET. The source 214 of transistor 202 forms a signal $SMPLZ_{13}$ SEMIBOOST 214. Source 21 is also connected to the negative terminal of capacitor 212.

Signal boost apparatus 120 includes a clock signal, $\Phi$ 210. In one embodiment, signal boost apparatus 120 uses $\Phi$ 210 to accomplish a signal-dependent clock boosting technique. In the illustrated embodiment, signal boost apparatus 120 employs this technique to boost analog input signal INP 110 when it is received by transistor 122 of A/D converter 100.

Capacitance boosting component 240 includes transistor 204. In one embodiment, transistor 204 is n-channel MOSFET. In the illustrated embodiment, transistor 204 receives Φ 210 at its gate, and its source is connected to electrical ground. The drain of transistor 204 is connected to the positive terminal 216 of capacitor 212.

In one embodiment of the present invention, transistor 206 is a n-channel MOSFET. In the illustrated embodiment, a gate of transistor 206 is connected to an inverse of clock signal Φ210, referred to as Φ220. A drain of transistor 206 is connected to drain 216 of transistor 204. A source of transistor 206 is connected to supply voltage $AV_{DD}$.

In one embodiment, transistor 208 is a p-channel MOSFET. The gate of transistor 208 is connected to Φ 210. In the illustrated embodiment, the drain of transistor 208 is connected to drain 216 of transistor 204. The source of transistor 208 is connected supply voltage $AV_{DD}$. In the illustrated embodiment, transistors 206 and 208 are arranged form a Complementary MOSFET (CMOS) switch 222.

The operation of signal boost apparatus 120 will now be considered in greater detail. In one embodiment, signal boost apparatus 120 is electrically connected to sample and hold circuitry for receiving analog signal INP 110 at an input-sampling switch of A/D converter 100. In operation, the sample and hold circuitry should introduce minimal distortion to achieve a high resolution for the digital signal output OUTP 130 by A/D converter 100. One way to achieve such a result is to implement an input-sampling switch of A/D converter 100 that is highly linear for a large range of input signal swing. In conventional sample and hold circuitry, a high frequency clock signal at the gate of the input-sampling switch corresponds to a high sampling frequency. High frequency signals at the source of transistor 122 along with a high sampling frequency are subject to signal-dependent parasitic effects that adversely affect the output of A/D converter 100. For an A/D converter that operates at sampling frequencies of 40 MHz or greater, or with digital output signal resolution of 12-bits or greater, uncompensated signal-dependent parasitic effects will overtake a digital signal output by A/D converter 100.

In one embodiment of the present invention, the function of the input-sampling switch of A/D converter 100 is performed by transistor 122. In the illustrated embodiment, signal boost apparatus 120 provides a voltage boost signal 250 to transistor 122. Voltage boost signal 250 is used by transistor 122 to boost the voltage of analog input signal INP 110. By boosting input signal INP 110, the effects of signal-dependent parasitic effects on digital signal output OUTP 130 of A/D converter 100 are minimized.

The input sample and hold phases for transistor 122 of A/D converter 100 are controlled by Φ 210. During an input sample phase, transistor 204 is in the on state, which connects the positive terminal of capacitor 212 to electrical ground. In this embodiment, capacitor 212 will be charged to a voltage of $AV_{DD}-(V_T+V_{ON})$, where $V_T$ is the threshold voltage of transistor 202, and $V_{ON}$ is the pinch off voltage of transistor 202. The sum of $V_T+V_{ON}$ represents the voltage drop from the gate to source of transistor 202. Thus, in the input sample phase, signal SMPLZ_SEMIBOOST 214 will be at a voltage of $AV_{DD}-(V_T+V_{ON})$.

During the hold phase, the positive terminal of capacitor 212 receives supply voltage $AV_{DD}$ through CMOS switch 222. In the illustrated embodiment, when supply voltage $AV_{DD}$ is applied to the positive terminal of capacitor 212, the voltage of signal SMPLZ_SEMIBOOST 214 rises to $AV_{DD}+(AV_{DD}-(V_T+V_{ON}))$, or $2AV_{DD}-(V_T+V_{ON})$. Thus, in this embodiment, the signal SMPLZ_SEMIBOOST 214 varies in value between $AV_{DD}-(V_T+V_{ON})$ during the sample phase and $2AV_{DD}-(V_T+V_{ON})$ during the hold phase.

Signal SMPLZ_SEMIBOOST 214 connects capacitance boosting component 240 with boost component 242. Boost component 242 contains transistors 226 and 228 as well as a capacitor 230. Boost component 242 also contains transistors 252, 254, 256, 258, and 260. In one embodiment, transistors 226, 228, 252, 254, 258, and 260 are n-channel MOSFETs, but other types and styles of transistors are within the scope of the present invention. In the illustrated embodiment, capacitor 230 is a one pico-Farad (1 pF) capacitor but other sizes of capacitor may be used as well. Other circuit designs for boost component 242 are envisioned that are also within the scope of the present invention. In the illustrated embodiment, voltage boosting signal 250 from boost component 242 becomes voltage boosting signal 250 at a gate of transistor 122, the input-sampling switch for A/D converter 100.

The operation of boost component 242 is controlled by Φ 210 that turns transistor 122 on and off. During the off phase, Φ 210 is low. In the illustrated embodiment, transistors 252 and 254 are operable to discharge voltage boosting signal 250 of transistor 122 to electrical ground. At the same time supply voltage $AV_{DD}$ is applied to capacitor 230 by transistors 226 and 228. Capacitor 230 acts as a battery across the gate and source of transistor 122 during the on phase of Φ 210. Transistors 256 and 258 are operable to isolate transistor 122 from capacitor 230 while capacitor 230 is charging.

When Φ 210 is high, transistor 260 pulls down the gate of transistor 256, allowing charge from capacitor 230 to flow onto voltage boosting signal 250. Voltage boosting signal 250 turns on both transistors 258 and 122. Transistor 258 enables voltage boosting signal 250 to track the input voltage of INP 110, shifted by supply voltage $AV_{DD}$. Thus, the gate-source voltage remains constant regardless of analog input signal INP 110.

When transistor 226 is in the on phase, it charges capacitor 230 unidirectionally to $AV_{DD}$. When transistor 226 is in the off phase, signal SMPLZ_SEMIBOOST 214 will be at a voltage of $AV_{DD}-(V_T+V_{ON})$ and the source of transistor 226 is a voltage of $AV_{DD}+V_S$. $V_S$ is given by $V_{CM}+V_{AC}$, where $V_{CM}$ is the common mode signal and $V_{AC}$ is the AC part of the analog input signal. Thus, in all practical cases, $V_S>0$, which means that transistor 226 is reverse biased. The maximum magnitude of the reverse bias of transistor 226 is give by $AV_{DD}+V_{CM}+V_{AC}-AV_{DD}+V_T+V_{ON}$, which simplifies to $V_{CM}+V_{AC}+V_T+V_{ON}$. As long as $V_{CM}+V_{AC}+V_T+V_{ON}<AV_{DD}$, the reliability of transistor 226 is not an issue regarding the resolution of digital signal OUTP 130 output by A/D converter 100. In one embodiment, signal boost apparatus 120 is configured to provide voltage boosting signal 250 to inverter 122 of A/D converter 100 that is within an acceptable boosting voltage range.

Conventional designs for a capacitor boosting component of a signal boost apparatus are implemented using at least two capacitors. In one embodiment of the present invention, capacitor boosting component 240 of signal boost apparatus 120 requires only one capacitor 214. Within circuits such as A/D converter 100, capacitors require a large surface area. Substantial circuit surface area may be saved by reducing the number of required capacitors down from two to one in signal boost apparatus 120.

Thus, it is apparent that there has been provided, in accordance with the present invention, a system and method for boosting an input signal that satisfies the advantages set forth above. Although the present invention has been described in detail, it should be un4understood that various changes, substitutions, and alterations may be made herein. For example, though discussed with reference to n-channel MOSFETs, the present invention may be equally incorporated with p-channel MOSFETs or other types of transistors. Other examples may be readily ascertainable by those skilled in the art and may be made herein without departing from the spirit and scope of the present invention as defined by the following claims.

What is claimed is:

1. A system for signal boosting, comprising:
   a capacitance boosting component, including:
   a first transistor operable to receive a supply voltage at a gate and a drain;
   a second transistor operable to receive a clock signal at a gate;
   a capacitor, wherein a positive terminal of the capacitor is electrically connected to a drain of the second transistor and a negative terminal of the capacitor is electrically connected to a source of the first transistor;
   a third transistor operable to receive the clock signal at a gate and further operable to receive the supply voltage at a source, wherein a drain of the third transistor is electrically connected to the positive terminal of the capacitor; and
   a fourth transistor operable to receive an inverse of the clock signal at a gate and further operable to receive the supply voltage at a source, wherein a drain of the fourth transistor is electrically connected to the positive terminal of the first capacitor; and
   a boost component electrically connected to the capacitance boosting component, wherein an output of the boost component is within a selected boost voltage range.

2. The system of claim 1, wherein the first, second, and fourth transistors are comprised of n-channel metal-oxide-semiconductor field effect transistors.

3. The system of claim 1, wherein the third transistor is comprised of a p-channel metal-oxide-semiconductor field effect transistor.

4. The system of claim 1, wherein the third and fourth comprise a complementary multi-oxide-semiconductor field effect transistor switch.

5. The system of claim 1, wherein the output of the boost component is electrically connected to an input-sampling switch of an analog to digital converter.

6. The system of claim 1, wherein the capacitor comprises a 1 pF capacitor.

7. The system of claim 1, wherein the system for signal boosting is coupled to a sample and hold circuit apparatus for an analog to digital signal converter.

8. the system of claim 1, wherein the boost component is electrically connected to the source of the first transistor.

9. The system of claim 8, wherein the clock signal is the clock signal from the analog to digital converter.

10. A method for signal boosting, comprising:
    receiving a supply voltage at a gate and a drain of a first transistor;
    receiving a clock signal at a gate of a second transistor;
    receiving the clock signal at a gate of a third transistor;
    receiving the supply voltage at a source of the third transistor;
    receiving an inverse of the clock signal at a gate of a fourth transistor;
    receiving the supply voltage at a source of the fourth transistor;
    receiving a signal at an input of a boost component from a source of the first transistor; and
    generating an output from the boost component,
    wherein the output of the boost component is within a selected boost output voltage range;
    a positive terminal of a capacitor is coupled to a drain of the second transistor;
    a negative terminal of the capacitor is coupled to a source of the first transistor; and
    a drain of the third transistor and a drain of the fourth transistor are coupled to the positive terminal of the capacitor.

11. The method of claim 10, wherein the first, second, and fourth transistors are comprised of n-channel metal-oxide-semiconductor field effect transistors.

12. The method of claim 10, wherein the third transistor is comprised of a p-channel metal-oxide-semiconductor field effect transistor.

13. The method of claim 10, wherein the third and fourth transistors form a complementary multi-oxide-semiconductor field effect transistor switch.

14. The method of claim 10, further including receiving the output of the boost component at an input-sampling switch of an analog to digital converter.

15. The method of claim 10, wherein the capacitor comprises a 1 pF capacitor.

16. The method of claim 10, further including receiving the output of the boost component at an input of a sample and hold circuit apparatus for analog to digital signal converter.

17. The method of claim 16, wherein the clock signal is the clock signal from the analog to digital converter.

18. The method of claim 10, wherein the boost component is electrically coupled to the source of the first transistor.

* * * * *